United States Patent
Gerdes et al.

(10) Patent No.: US 8,866,433 B2
(45) Date of Patent: Oct. 21, 2014

(54) SWITCHED RELUCTANCE INITIAL ROTOR POSITION ESTIMATION

(71) Applicant: Caterpillar Inc., Peoria, IL (US)

(72) Inventors: Jesse Gerdes, Dunlap, IL (US); Jackson Wai, Dunlap, IL (US); Mark Hartman, Peoria, IL (US); Ahmed Khalil, Peoria, IL (US); Carlos Nino Baron, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 13/664,623

(22) Filed: Oct. 31, 2012

(65) Prior Publication Data

US 2014/0117901 A1 May 1, 2014

(51) Int. Cl.
H02P 6/00 (2006.01)
H02P 6/18 (2006.01)
H02P 25/08 (2006.01)

(52) U.S. Cl.
CPC .............. *H02P 6/182* (2013.01); *H02P 25/083* (2013.01)
USPC ....... 318/701; 318/721; 318/400.14; 318/652

(58) Field of Classification Search
CPC ........... H02P 25/083; H02P 6/18; H02P 6/10; H02P 21/146; H02P 6/00; H02P 6/085; H02P 21/0046; H02P 2207/05; H02P 25/023; H02P 25/08; H02P 25/082; H02P 6/002; H02P 6/06; H02P 6/08; H02P 6/14; H02P 6/182
USPC .......... 318/701, 721, 400.14, 400.15, 400.32, 318/400.33, 799, 430, 432, 434, 437, 599, 318/652
See application file for complete search history.

(56) References Cited

U.S. PATENT DOCUMENTS

| | | | |
|---|---|---|---|
| 5,140,243 A | 8/1992 | Lyons et al. | |
| 5,173,650 A | 12/1992 | Hedlund | |
| 5,467,025 A | 11/1995 | Ray | |
| 5,525,886 A | 6/1996 | Lyons et al. | |
| 6,153,956 A | 11/2000 | Branecky | |
| 6,359,412 B1 * | 3/2002 | Heglund | 318/701 |
| 6,448,736 B1 | 9/2002 | Lajsner et al. | |
| 6,831,439 B2 | 12/2004 | Won et al. | |
| 6,853,163 B2 * | 2/2005 | Slater | 318/700 |
| 6,989,668 B2 * | 1/2006 | Mayes | 318/254.1 |
| 7,288,915 B2 | 10/2007 | Norman et al. | |

FOREIGN PATENT DOCUMENTS

| | | |
|---|---|---|
| EP | 0533413 | 3/1993 |
| JP | 2006129667 | 5/2006 |
| KR | 1020000013673 | 3/2000 |

* cited by examiner

Primary Examiner — Antony M Paul
(74) Attorney, Agent, or Firm — Miller, Matthias & Hull

(57) ABSTRACT

A method of estimating an initial rotor position of a switched reluctance (SR) machine having a rotor and a stator is provided. The method may comprise the steps of driving a phase current in each of a plurality of phases of the SR machine to a predefined limit, performing an integration of a common bus voltage associated with each phase, determining a flux value for each phase based on the integrations, and determining the initial rotor position based on the flux values.

17 Claims, 4 Drawing Sheets

SWITCHED RELUCTANCE INITIAL ROTOR POSITION ESTIMATION

TECHNICAL FIELD

The present disclosure relates generally to switched reluctance machines, and more particularly, to systems and methods for determining the initial rotor position of switched reluctance machines.

BACKGROUND

An electric machine such as an electrical motor, power generation system, genset, or the like, is generally used to convert one form of energy into another and may operate in a motoring mode to convert electrical power into rotational or otherwise mechanical power, or operate in a generating mode to convert rotational or otherwise mechanical power into electrical power. Among the various types of machines available for use with an electric drive, switched reluctance (SR) machines have received great interest for being robust and cost-effective. While currently existing systems and methods for controlling such electric machines provide adequate control, there is still room for improvement.

Among other factors, proper detection or estimation of the initial position of the rotor relative to the stator of the SR machine, while at rest or at an otherwise substantially low machine speed, is essential to the performance and efficiency of the SR machine. Some conventional control schemes rely on a mechanically aligned speed wheel and corresponding sensors to detect and determine the initial position of the rotor relative to the stator at machine startup. However, such control schemes have been frequently found to be susceptible to error, thus resulting in substantial losses in efficiency during operation. For instance, an error of 2 degrees in the detected mechanical rotor position of an SR machine, caused by a skewed sensor, a mechanical misalignment of the speed wheel, or the like, may correspond to a 0.5% decrease in efficiency of the electric drive assembly at full load.

Sensorless control schemes also exist and derive or calculate the initial rotor position using electrical characteristics of the SR machine. However, as with the sensor-based schemes, these electric drive assemblies have also been found to be deficient and susceptible to much error. Specifically, the theoretical models upon which the derivations are based, when reduced to actual experimentation or practice, were often found to cause substantial deviations from the desired effects in terms of machine performance and efficiency. Furthermore, the accuracy of currently existing sensorless control schemes have been found to be easily affected by normally occurring changes in the associated electric drive, such as the common bus or direct current (DC) link voltage.

Accordingly, there is a need to provide a control system or scheme for estimating the initial position of a rotor of an SR machine that enables more efficient operation and performance of the SR machine. Moreover, there is a need to provide an initial rotor position estimation means that is more reliable, more accurate, less susceptible to a varying DC link voltage and easier to implement. There is also a need to minimize torque production so as to substantially minimize any undesired movement of the machine. The systems and methods disclosed are directed at addressing one or more of these needs.

SUMMARY OF THE DISCLOSURE

In one aspect of the present disclosure, a method of estimating an initial rotor position of a switched reluctance (SR) machine having a rotor and a stator is provided. The method may comprise the steps of driving a phase current in each of a plurality of phases of the SR machine to a predefined limit, performing an integration of a common bus voltage associated with each phase, determining a flux value for each phase based on the integrations, and determining the initial rotor position based on the flux values.

In another aspect of the disclosure, an initial rotor position estimation system for an SR machine having a rotor and a stator is provided. The initial rotor position estimation system may include a converter circuit in electrical communication between the stator and a common bus, and a controller in electrical communication with at least the converter circuit. The controller may be configured to drive a phase current in each of a plurality of phases of the SR machine to a predefined limit, integrate a voltage across the common bus in association with each phase, determine a flux value for each phase based on the integrations, and determine an initial position of the rotor based on the flux values.

In yet another aspect of the disclosure, an electric drive apparatus is provided. The electric drive apparatus may include an SR machine, a converter circuit and a controller. The SR machine may include a rotor that is coupled to a primary power source and rotatably disposed in proximity to a stator. The converter circuit may be configured to electrically communicate with the stator and a common bus. The controller may be in electrical communication with at least the converter circuit and configured to drive a phase current in each of a plurality of phases of the SR machine to a predefined limit, integrate a voltage across the common bus in association with each phase, determine a flux value for each phase based on the integrations, and determine an initial position of the rotor based on the flux values.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
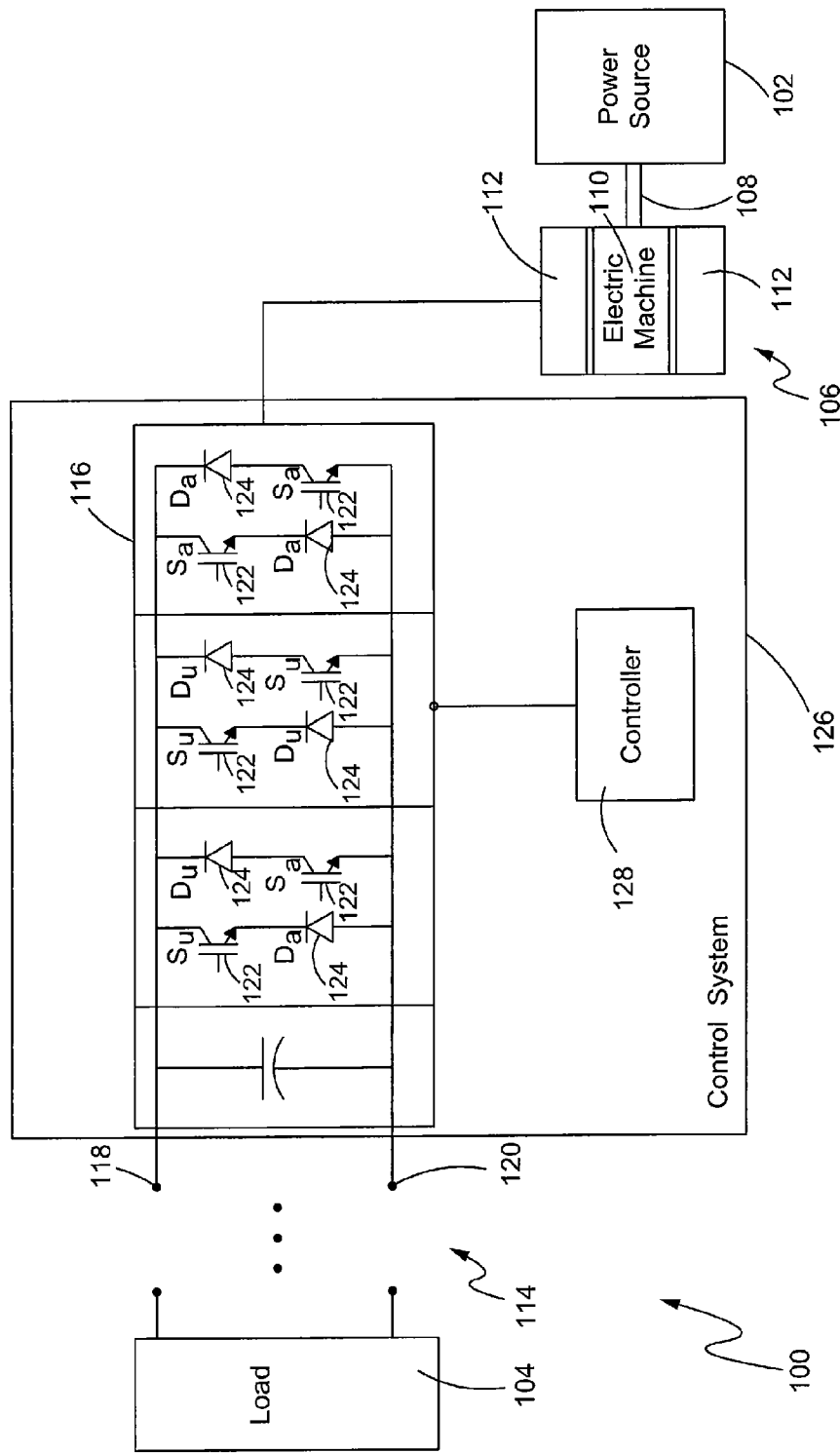
FIG. 1 is a schematic view of an exemplary embodiment of an initial rotor position estimation system as applied to a switched reluctance (SR) machine of an electric drive.

FIG. 1 schematically illustrates an exemplary electric drive 100 that may be employed to communicate power between a primary power source 102 and one or more electrical loads 104. The primary power source 102 may include, for example, a diesel engine, a gasoline engine, a natural gas engine, or any other type of rotational source of mechanical energy commonly used in association with mobile tools or industrial machines. The power source 102 may also be used in conjunction with stationary applications and be implemented with, for instance, windmills, hydro-electric dams, batteries, fuel cells, or any other suitable source of energy. The load 104 may include one or more devices or components which consume and/or employ electrical power provided thereto by the electric drive 100. For example, with respect to industrial work machines or mobile work vehicles, the load 104 may include one or more motors for operating tools of the machine and/or one or more traction motors for causing motion of the vehicle. Mechanical energy that is supplied by the primary power source 102 may be converted into electrical power by the electric drive 100 for use by one or more of the loads 104. Conversely, any electrical power that is supplied by the loads 104 and/or the electric drive 100 may be supplied to drive mechanical power to the power source 102.

As shown in the particular embodiment of FIG. 1, the electric drive 100 may communicate with the primary power source 102 through a switched reluctance (SR) machine 106, or the like. As is well known in the art, the SR machine 106 may include a rotor 110 that is rotatably disposed within a fixed stator 112. The rotor 110 of the SR machine 106 may be rigidly and rotatably coupled to an output of the primary power source 102 via a coupling 108, or in other embodiments, via a direct crankshaft, a gear train, a hydraulic circuit, or the like. Each phase winding or simply phase of the stator 112 of the SR machine 106 may be electrically coupled to a common bus 114 of the electric drive 100 via a converter circuit 116.

During a generating mode of operation, as the rotor 110 of the SR machine 106 is rotated within the stator 112 by the power source 102, electrical current may be induced within the stator 112 and supplied to the converter circuit 116. The converter circuit 116 may in turn convert the electrical signals into the appropriate direct current (DC) voltage for distribution to the electrical load 104 and/or any other device via the common bus 114. The common bus 114 may provide a positive line 118 and a negative or ground line 120 across which the common bus 114 may communicate a bus voltage or DC link voltage between one or more electrically parallel devices of the electric drive assembly 100. The load 104 may include circuitry for converting the DC voltage supplied by the converter circuit 116 into the appropriate electrical signals for operating any one or more devices associated with the electric drive 100. Additionally, during a motoring mode of operation, or when the electrical load 104 becomes the sink of electrical power, the SR machine 106 may be enabled to cause rotation of the rotor 110 in response to electrical signals that are provided to the stator 112 from the common bus 114.

As shown in FIG. 1, the converter circuit 116 may include a series of transistors or gated switches 122 and diodes 124 for selectively enabling one or more phase windings or phases of the SR machine 106. A three-phase SR machine 106, for example, may be driven using a converter circuit 116 with six switches 122 and six diodes 124 for selectively enabling or disabling each of the three phases of the SR machine 106. Each of the switches 122 may further be enabled or disabled via gate signals while an external or secondary power source 126 provides power across the positive and negative lines 118, 120 of the common bus 114 to force current through the respectively enabled switches 122 and diodes 124.

Still referring to FIG. 1, the electric drive 100 may also be provided with an exemplary control system 126 configured to, among other things, estimate the initial position of the rotor 110 of the SR machine 106 relative to the stator 112. As illustrated in FIG. 1, the control system 126 may generally comprise the converter circuit 116 and one or more controllers 128 in communication with the gated switches 122 of the converter circuit 116. More particularly, the controller 128 may be electrically coupled to the switches 122 in a manner which enables the controller 128 to selectively engage the switches 122 and source current through the different phases of the SR machine 106, as well as in a manner which enables the controller 128 to monitor electrical characteristics of the SR machine 106 and the bus or DC link voltage of the common bus 114 during operation of the SR machine 106.

The controller 128 may be implemented using one or more of a processor, a microprocessor, a microcontroller, a digital signal processor (DSP), a field-programmable gate array (FPGA), an electronic control module ECM, an electronic control unit ECU, or any other suitable means for electronically controlling functionality of the control system 126. The controller 128 may be configured to operate according to a predetermined algorithm or set of instructions for operating the electric drive 100 based on the rotational speed and/or position of the rotor 110 relative to the stator 112 and other operating characteristics of the electric drive 100. Such an algorithm or set of instructions may be preprogrammed or incorporated into a memory that is accessible to and/or disposed within the controller 128 as is commonly held in the art.

Figure 2:
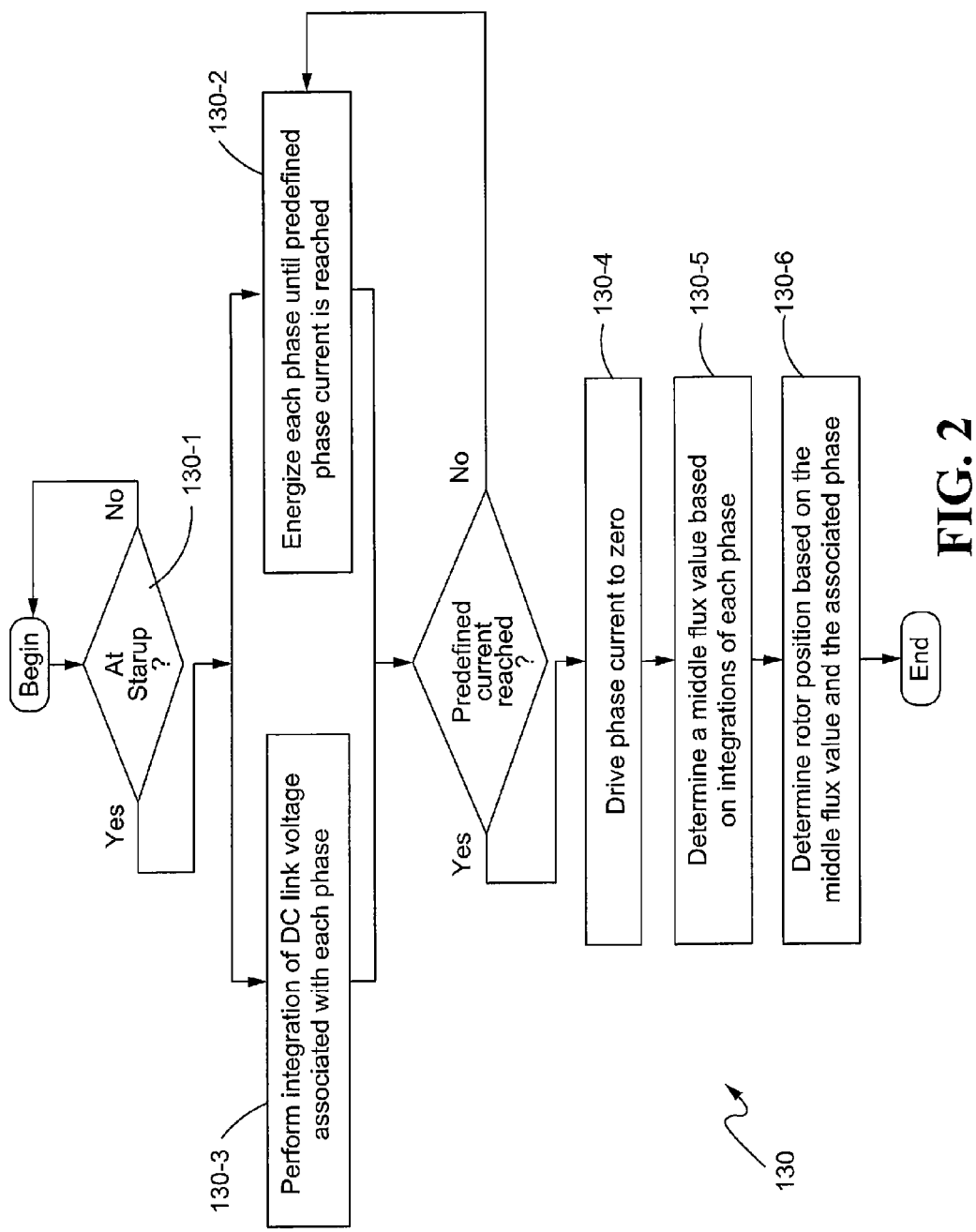
FIG. 2 is a flow diagram of a method of estimating the initial rotor position of an SR machine.

Referring now to FIG. 2, one exemplary algorithm or method 130 of estimating the initial position of the rotor 110 relative to the stator 112 is provided with a plurality of steps that may be selectively performed by the controller 128, for instance, during a startup stage of the SR machine 106 and/or when the operational machine speed of the SR machine 106 is at a substantially low speed. Specifically, during the startup stage, the machine speed may be at zero, approximately at zero, or at an otherwise relatively low machine speed as compared to the rise time of the current. For example, in an initial step 130-1, the controller 128 may be configured to remain in a standby state and monitor for any instruction signals or other significant changes indicative of a desired startup of the SR machine 106. At this time, the controller 128 may additionally monitor the machine speed, or the rotational speed of the rotor 110 of the SR machine 106 relative to the stator 112 to determine if the machine speed is substantially at rest.

Figure 3:
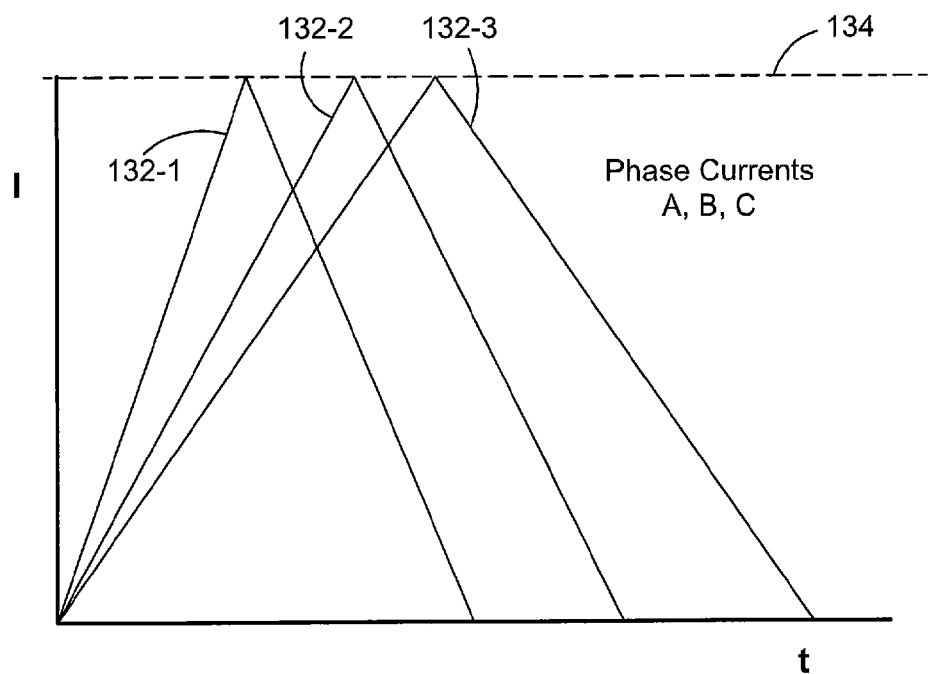
FIG. 3 is a graphical view of the phase currents in each phase of the SR machine during the energizing and de-energizing stages of the method of FIG. 2.

When the machine speed is deemed to be low enough, the controller 128 may proceed to step 130-2 in order to initiate the initial rotor position estimation process and begin energizing each phase of the connected SR machine 106. In particular, the controller 128 may be configured to selectively enable the switches 122 of the converter circuit 116 in a manner which drives a current through each phase of the stator 112. In such a way, the controller 128 may continue energizing the phases of the SR machine 106 until the phase current 132 through each phase reaches a uniform and predefined limit 134, as graphically demonstrated for example in FIG. 3. Additionally, the controller 128 may initiate the energizing step 130-2 for each phase of the SR machine 106 simultaneously so as to minimize any undesired torque production by the SR machine 106.

Figure 4:
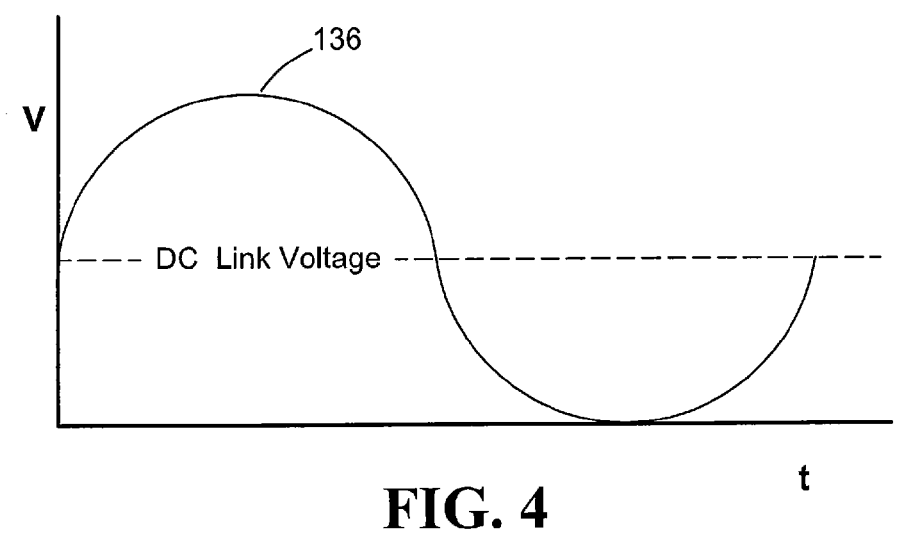
FIG. 4 is a graphical view of the common bus or direct current (DC) link voltage in association with each of the phases of the SR generator.

During the energizing step 130-2, the controller 128 may additionally and/or simultaneously be configured to mathematically integrate the bus or DC link voltage 136 across the common bus 114 in step 130-3 so as to characterize the amount of flux that is introduced through each phase of the SR machine 106 by the phase currents 132. More specifically, as shown in FIG. 4 for example, the controller 128 may perform an integration over the DC link voltage 136 in association with each phase of the SR machine 106 and for the duration of time that the phase current 132 is driven to the predefined limit 134. Once the phase current 132 in each phase reaches the predefined limit 134 during the concurrent energizing step 130-2, the controller 128 may be configured to de-energize or drive down the phase current 132 in each phase of the stator 112 back down to zero, or an otherwise substantially low machine speed, in step 130-4, as shown for example in FIG. 3.

Based on the results of the integrations performed during step 130-3, the controller 128 may proceed to determine at least the phase of the SR machine 106 exhibiting a middle flux value in step 130-5. Moreover, the controller 128 may be configured to use the integrations of step 130-3 to derive a flux value corresponding to each phase of the SR machine 106. By comparing the relative magnitudes of the resulting flux values, for example, the controller 128 may be able to associate each phase of the SR machine 106 as exhibiting a relatively high flux value, a middle flux value, a relatively low flux value, or use any other suitable means of classification. In such a way, the controller 128 may be able to determine the flux value which corresponds to the middle flux value, as well as the specific phase associated therewith to be used for further analyses. While other regions of flux values, such as the high and low flux value regions, may also be similarly employed, the middle flux value may offer the best accuracy as it reflects a higher rate of change and thus a substantially resolution of the change in flux relative to the different rotor positions.

In yet a further step 130-6, the controller 128 may be configured to estimate the initial position of the rotor 110 relative to the stator 112 based on the middle flux value and the corresponding phase of the SR machine 106 obtained from step 130-5. In particular, the controller 128 may be preprogrammed with a lookup map and/or table 138, as shown for example in FIG. 5, from which the controller 128 may determine the rotor position which corresponds to the middle flux value and associated phase previously determined through its integrations and comparisons. As shown, the lookup table 138 may include a predefined mapping of the different flux values that are possible for each phase of the SR machine 106 being employed. Furthermore, due to the periodic nature of the flux exhibited by each phase relative to rotor position, only a portion, such as a half of a period, of each phase may be preprogrammed while the other half may be derived by mirroring or by other processes so as to minimize the amount of data that is stored. Similarly, rather than preprogramming the flux values for each individual phase of the SR machine 106, only a single phase, or a portion thereof, may be provided, from which the corresponding flux values for the remaining phases may be derived by phase-shifting the data.

Figure 5:
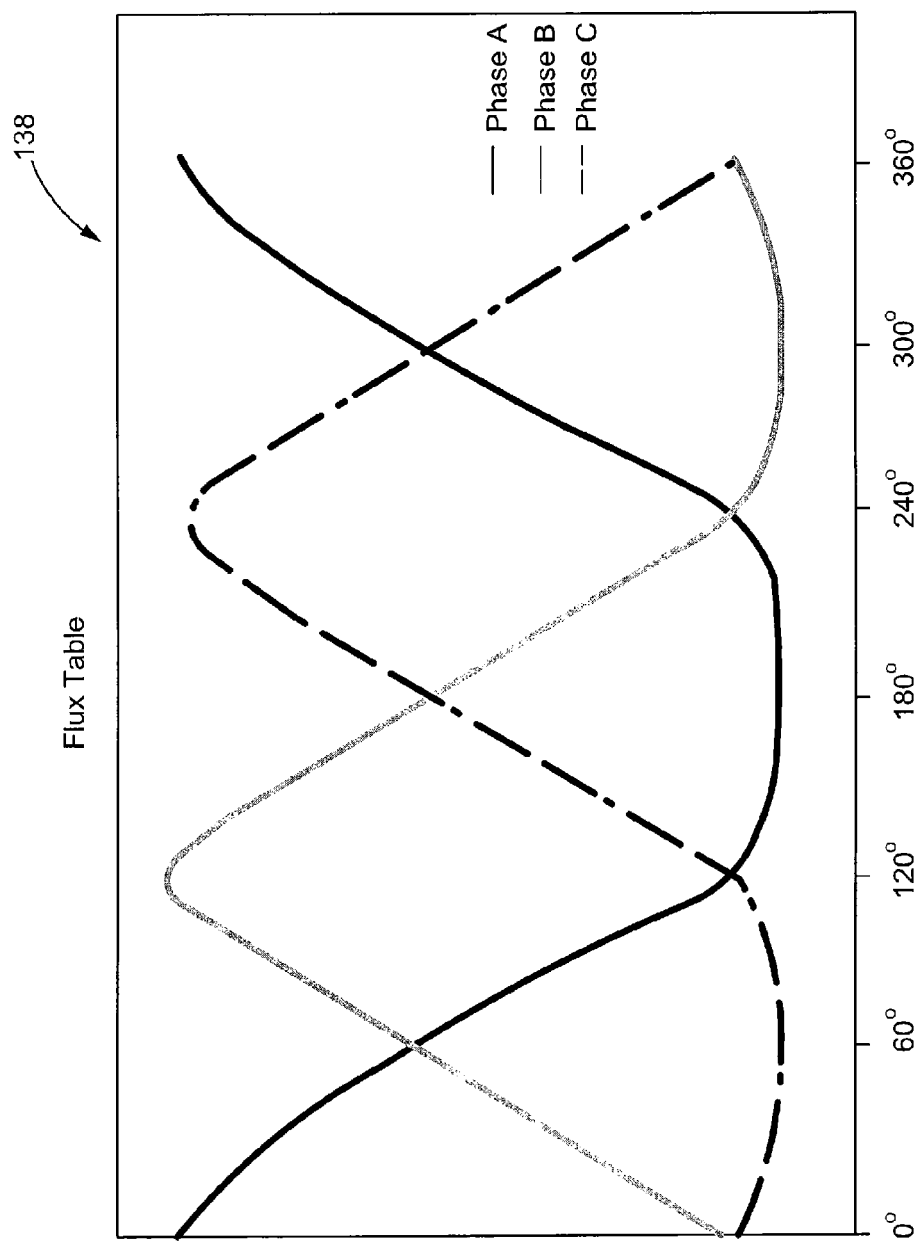
FIG. 5 is a graphical view of a flux lookup map and/or table which may be preprogrammed and/or derived to relate different flux values and corresponding phases of the SR machine to varying initial rotor positions of the SR machine.

The extended lookup table 138 of FIG. 5 not only indicates how the flux value for a particular phase may vary with rotor position, but also how the respective flux values for all the phases will vary relative to one another. For rotor positions between approximately 0° and 60° for instance, phase A exhibits relatively higher flux values, phase B exhibits mid-range flux values and phase C exhibits relatively lower flux values. However, for rotor positions between approximately 240° and 300°, phase C exhibits relatively higher flux values, phase A exhibits mid-range flux values and phase B exhibits relatively lower flux values. Accordingly, in the three-phase application shown in FIG. 5, each phase may exhibit a middle flux value in two different regions, one region corresponding to the rising slope and one region corresponding to the falling slope thereof. Thus, for a given 360° window of rotor position, the map or table 138 may provide six distinguishable regions of flux values with which the controller 128 may estimate the initial rotor position with substantial accuracy. Once the initial rotor position estimation is complete, the controller 128 may then exit the startup routine and employ the estimation for the purposes of calibrating the associated SR machine 106 and as an absolute reference by which other machine tasks and operations are controlled.

INDUSTRIAL APPLICABILITY

In general, the foregoing disclosure finds utility in various applications relating to switched reluctance (SR) machines or any other suitable electric machine being employed as motors and/or generators. In particular, the disclosed systems and methods may be used to provide more efficient control of electric machines such as SR machines that are typically employed in association with the electric drives of power generation machines, industrial work vehicles, and any other types of mobile as well as stationary machines commonly used in the art.

More specifically, the present disclosure provides a more simplified sensorless approach of estimating the initial position of a rotor of an SR machine while at a substantially low machine speed during a startup routine which requires minimal components and controller resources. Still further, the systems and methods disclosed herein serve to provide a more accurate and reliable estimation of the initial rotor position such that operations of the SR machine thereafter are carried out more efficiently. The present disclosure also provides means for detecting initial rotor position in a manner that is substantially unaffected by changes in the bus voltage of the electric drive associated with the SR machine.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of estimating an initial rotor position of a switched reluctance (SR) machine having a rotor and a stator, comprising the steps of:
    driving a phase current in each of a plurality of phases of the SR machine to a predefined limit;
    performing an integration of a common bus voltage associated with each phase;
    determining a flux value for each phase based on the integrations;
    determining the initial rotor position based on the flux values;
    determining a middle flux value based on relative magnitudes of the flux values;
    determining the phase corresponding to the middle flux value; and
    determining the initial rotor position based on the middle flux value and the corresponding phase.

2. The method of claim 1, wherein the initial rotor position is determined based on a preprogrammed lookup table which relates different middle flux values and corresponding phases to different initial rotor positions.

3. The method of claim 1, wherein the phase current through each phase is driven simultaneously to reduce torque production.

4. The method of claim 1, wherein the phase current in each phase is driven to a substantially low machine speed once the predefined limit is reached to reduce torque production.

5. The method of claim 1, wherein the integration is performed until the predefined limit is reached.

6. The method of claim 1 being performed at startup and at a substantially low machine speed of the SR machine.

7. An initial rotor position estimation system for a switched reluctance (SR) machine having a rotor and a stator, comprising:
   a converter circuit in electrical communication between the stator and a common bus; and
   a controller in electrical communication with at least the converter circuit, the controller being configured to drive a phase current in each of a plurality of phases of the SR machine to a predefined limit, integrate a voltage across the common bus in association with each phase, determine a flux value for each phase based on the integrations, determine an initial position of the rotor based on the flux values, determine a middle flux value based on relative magnitudes of the flux values, determine the phase corresponding to the middle flux value, and determine the initial rotor position based on the middle flux value and the corresponding phase.

8. The system of claim 7, wherein the controller is preprogrammed with a lookup table relating different middle flux values and corresponding phases to different initial rotor positions, the controller being configured to reference the initial rotor position from the lookup table.

9. The system of claim 7, wherein the controller is configured to drive the phase current through each phase simultaneously to reduce torque production.

10. The system of claim 7, wherein the controller is configured to integrate the common bus voltage only while the corresponding phase current is driven to the predefined limit.

11. The system of claim 7, wherein the controller is configured to determine the initial position of the rotor at startup of the SR machine and at a substantially low machine speed of the SR machine.

12. An electric drive apparatus, comprising:
   a switched reluctance (SR) machine having a stator and a rotor, the rotor being coupled to a primary power source and rotatably disposed in proximity to the stator;
   a converter circuit configured to electrically communicate with the stator and a common bus; and
   a controller in electrical communication with at least the converter circuit, the controller being configured to drive a phase current in each of a plurality of phases of the SR machine to a predefined limit, integrate a voltage across the common bus in association with each phase, determine a flux value for each phase based on the integrations, determine an initial position of the rotor based on the flux values, determine a middle flux value based on relative magnitudes of the flux values, determine the phase corresponding to the middle flux value, and determine the initial rotor position based on the middle flux value and the corresponding phase.

13. The apparatus of claim 12, wherein the controller is preprogrammed with a lookup table relating different middle flux values and corresponding phases to different initial rotor positions, the controller being configured to reference the initial rotor position from the lookup table.

14. The apparatus of claim 12, wherein the controller is configured to drive the phase current through each phase simultaneously to reduce torque production.

15. The apparatus of claim 12, wherein the controller is configured to drive the phase current in each phase to a substantially low machine speed once the predefined limit is reached to reduce torque production.

16. The apparatus of claim 12, wherein the controller is configured to integrate the common bus voltage only while the corresponding phase current is driven to the predefined limit.

17. The apparatus of claim 12, wherein the controller is configured to determine the initial position of the rotor at startup of the SR machine and at a substantially low speed of the SR machine.

* * * * *